United States Patent
Miyagawa et al.

(10) Patent No.: US 9,975,398 B2
(45) Date of Patent: May 22, 2018

(54) CONTROL DEVICE OF VEHICLE

(71) Applicant: MAZDA MOTOR CORPORATION, Hiroshima (JP)

(72) Inventors: Kazuhiro Miyagawa, Hiroshima (JP); Shinobu Kato, Hiroshima (JP); Naoki Takata, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 179 days.

(21) Appl. No.: 14/711,655

(22) Filed: May 13, 2015

(65) Prior Publication Data

US 2016/0016455 A1    Jan. 21, 2016

(30) Foreign Application Priority Data

Jul. 17, 2014  (JP) .................................. 2014-146560

(51) Int. Cl.
*B60H 1/32* (2006.01)
*B60H 1/00* (2006.01)

(52) U.S. Cl.
CPC ..... *B60H 1/00742* (2013.01); *B60H 1/00764* (2013.01); *B60H 2001/002* (2013.01)

(58) Field of Classification Search
CPC ................ B60H 1/00; B60H 2001/002; B60H 2001/00242; B60H 1/00764; B60H 1/00742
See application file for complete search history.

(56) References Cited

U.S. PATENT DOCUMENTS

| | | | | |
|---|---|---|---|---|
| 6,827,284 B2 * | 12/2004 | Ichishi | ............... | B60H 1/00735 165/204 |
| 7,610,143 B1 * | 10/2009 | Boesch | ................... | B60K 6/365 701/112 |
| 2003/0213255 A1 * | 11/2003 | Nosaka | .................. | B60H 1/323 62/175 |
| 2008/0248736 A1 * | 10/2008 | Aoki | .................. | B60H 1/00742 454/75 |
| 2014/0027090 A1 * | 1/2014 | Morikawa | .......... | B60H 1/00828 165/47 |
| 2014/0096945 A1 * | 4/2014 | Ghosh | ................ | B60H 1/00742 165/204 |

FOREIGN PATENT DOCUMENTS

JP    2010-280354 A    12/2010

* cited by examiner

*Primary Examiner* — David Teitelbaum
*Assistant Examiner* — Kamran Tavakoldavani
(74) *Attorney, Agent, or Firm* — Studebaker & Brackett PC

(57) ABSTRACT

A front-seat air conditioner and a rear-seat air conditioner, which are independent from each other, are provided. An engine is automatically stopped under preset stop conditions. When the engine is automatically stopped in a case in which the number of passengers is a specified preset number (five, for example) or larger during heating, the operation of the rear-seat air conditioner is stopped (reduction of power consumption) and the operation of the front-seat air conditioner is continued (prevention of windshield glass from being fogged). Thereby, the windshield glass can be prevented from being fogged during the engine's automatic stop, reducing the power consumption of air conditioning.

10 Claims, 10 Drawing Sheets

CONTROL DEVICE OF VEHICLE

BACKGROUND OF THE INVENTION

The present invention relates to a control device of a vehicle provided with a front-seat air conditioner, a rear-seat air conditioner, and an engine to be automatically stopped by idling stop.

An air-conditioning control device for a vehicle comprises a compressor, a cool-air generator including a condenser and an evaporator, and a hot-air generator having a heat source of engine cooling water, and provides conditioning air having a desired temperature by changing the mixture ratio of cool air and hot air with an air mix damper. The conditioning air is supplied into a vehicle compartment by means of a blower fan, and the supply amount of the conditioning air is adjusted by changing a rotational speed of the blower fan. In general, the above-described compressor is driven by an engine, and a water pump to circulate the cooling water is also driven by the engine. Accordingly, when the engine stops, the compressor and the water pump stop, too.

Further, an automatic air conditioner to automatically control an actual temperature inside the vehicle compartment at a target temperature has become the mainstream of the air-conditioning control device for a vehicle. The automatic control of air conditioning is performed based on the environmental conditions inside the vehicle compartment, the environmental conditions outside the vehicle compartment, and parameters representing the air-conditioning operational states set by a passenger (setting of the target temperature inside the vehicle compartment, particularly), whereby the conditioning-air supply temperature, the conditioning-air outlet, the conditioning-air supply amount and others are automatically adjusted.

Meanwhile, many vehicles have recently adopted so-called idling stop in which the engine is automatically stopped when the vehicle stops or travels at a very low speed before the vehicle's stopping in order to improve the fuel economy (gas millage). This idling stop is executed on condition that the preset stop condition is met. This preset stop condition is generally set such that all conditions of a vehicle speed being zero (i.e., the vehicle's stopping), a brake being operated, an accelerator being operated, a shift change being located at a D position, and others are met.

The operation of the air conditioner is generally continued even during the engine's automatic stop by the idling stop from a passenger's comfortability viewpoint. That is, even if the engine is automatically stopped, the air-conditioning control using the cooling function of the evaporator is continuously performed until the temperature of the evaporator increases up to a specified upper-limit temperature, and the air-conditioning control using the heating function of the heater core is continuously performed until the temperature of the heater core decreases to a specified lower-limit temperature. Herein, when the temperature of the evaporator increases over the upper-limit temperature during the cooling, or when the temperature of the heater core decreases below the lower-limit temperature during the heating, the engine is automatically restarted.

In the meantime, some wagon-type or large-sized SUV vehicles have three row seats comprising a first row seat including a driver's seat, a second row seat arranged in back of the first row seat, a third row seat arranged in back of the second row seat. Herein, a space for air conditioning inside the vehicle compartment is so large that an air conditioner for a rear seat (i.e., a rear-seat air conditioner) is generally provided, additionally to an air conditioner for a front seat (i.e., a front-seat air conditioner) of the first row seat.

There is a tendency that the humidity inside the vehicle compartment goes up as the number of passengers increases. Japanese Patent Laid-Open Publication No. 2010-280354 discloses a control in which the operational term of the idling stop is changed according to the number of passengers, and when the humidity inside the vehicle compartment detected by a humidity sensor is high, the opportunity of performing the dehumidification function by the air conditioner is increased so as to attain defogging of windshield glass.

In a case in which both the front-seat air conditioner and the rear-seat air conditioner are separately independent from each other as described above, it may be considered that these both air conditioners are continuously operated during the engine's automatic stop in order to ensure the comfortability for both the front-seat passenger and the rear-seat passenger. In this case, however, the operations of the both air conditioners require a large amount of power consumption.

Accordingly, it may be considered that the operations of the front-seat air conditioner and the rear-seat air conditioner are stopped alternately to reduce the power consumption during the engine's automatic stop. In this case, however, there may be a problem in that the windshield glass is fogged during the heating, in particular. In a case in which the number of passengers is large particularly, the vehicle equipped with its rear seat having a large capacity for passengers may have this problem, in particular.

SUMMARY OF THE INVENTION

The present has been devised in view of the above-described matters, and an object of the present invention is to provide a control device of the vehicle provided with the front-seat air conditioner (i.e., the air conditioner for the front seat) and the rear-seat air conditioner (i.e., the air conditioner for the rear seat) which are separately independent from each other, which can prevent the windshield glass from being fogged during the engine's automatic stop, reducing the power consumption of the air conditioning.

The present invention is a control device of a vehicle provided with a front-seat air conditioner, a rear-seat air conditioner which is separately independent from the front-seat air conditioner, and an engine to be automatically stopped under preset stop-conditions, the control device comprising a controller to control operations of the front-seat air conditioner and the rear-seat air conditioner and an automatic stop of the engine, wherein the above-described controller is configured such that in a case in which an automatic-stop control of the engine is performed when heating is under operation and the number of passengers of the vehicle is a preset number or more, the operation of the rear-seat air conditioner is stopped and the operation of the front-seat air conditioner is continued.

According to the present invention, the operation of the rear-seat air conditioner is stopped during the engine's automatic stop, and the power consumption can be reduced accordingly. Further, the front-seat air conditioner is continuously operated, and the windshield glass can be prevented from being fogged accordingly. Moreover, stopping of the operation of the rear-seat air conditioner is executed on condition that it has been confirmed that the number of passengers as a heat source is large, i.e., that it has been confirmed that the heating need for the rear seat is low, so that there is no problem in performing the proper heating of the passengers of the rear seat.

In an embodiment of the present invention, the vehicle is configured such that the number of passengers who are capable of being seated at a position which is located in back of an air outlet of the front-seat air conditioner but in front of an air outlet of the rear-seat air conditioner is smaller than the number of passengers capable of being seated at another position located in back of the air outlet of the rear-seat air conditioner. Herein, the present invention is preferably applied to the vehicle in which the number of passengers of the rear seat is large, i.e., the vehicle which may have a low heating need for the rear seat, so as to provide the effects of the present invention properly.

In another embodiment of the present invention, when the stopping of the operation of the rear-seat air conditioner is performed, an operational mode of the front-seat air conditioner is adjusted at an outside-air introduction mode. Herein, a burden of a heat exchanger for cooling of the front-seat air conditioner can be reduced by introducing cool and low-humidity outside air, so that this embodiment is preferable in ensuring a properly long term of the engine's automatic stop, preventing the windshield glass from being fogged.

In another embodiment of the present invention, the vehicle has a first row seat including a driver's seat, a second row seat, and a third row seat in order from the front to the rear of the vehicle, the air outlet of the front-seat air conditioner is located in front of the first row seat, and the air outlet of the rear-seat air conditioner is located in the vicinity of a rear portion of the first row seat and in front of the second row seat. Herein, the vehicle according to this embodiment has a large number of passengers capable of being seated in the rear seat which is composed of the second row seat and the third seat, so that this embodiment is preferable in providing the effects of the present invention properly.

Other features, aspects, and advantages of the present invention will become apparent from the following description which refers to the accompanying drawings.

DETAILED DESCRIPTION OF THE INVENTION

Figure 1:
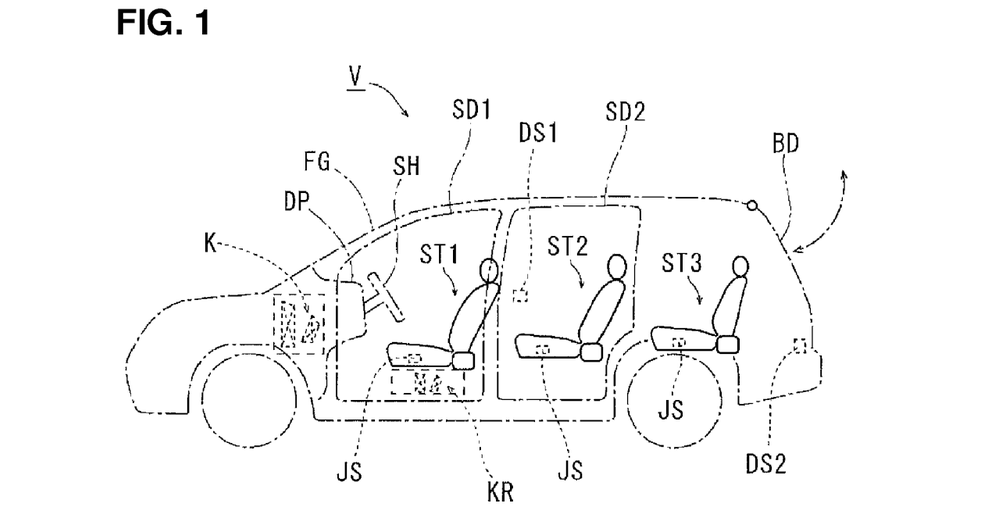
FIG. 1 is a brief side view of a vehicle to which the present invention is applied.
Figure 2:
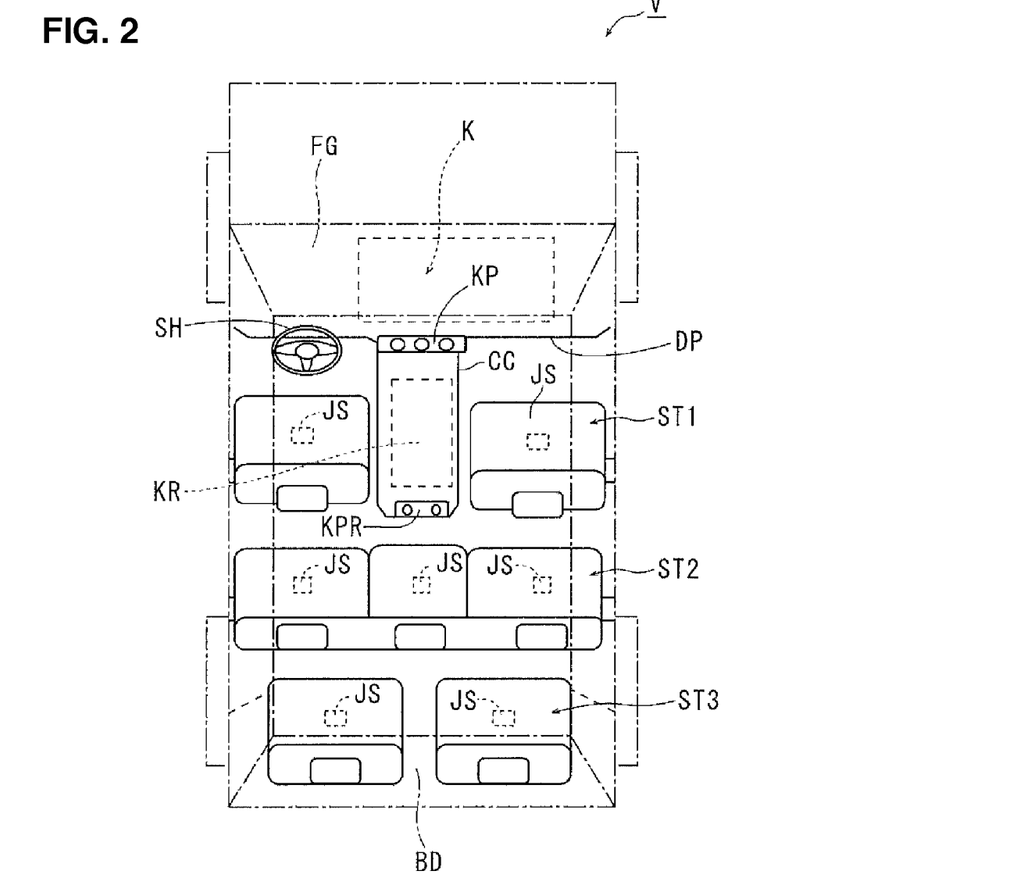
FIG. 2 is a brief plan view of the vehicle to which the present invention is applied.

FIGS. 1 and 2 show an example of a vehicle V to which the present invention is applied. A seat where passengers are seated comprises a first row seat ST1 as a front seat which is composed of a driver's seat and an assistant driver's seat, a second row seat ST2 as a part of a rear seat, and a third row seat ST3 as another part of the rear seat, where are arranged in order from the vehicle front to the vehicle rear. In FIGS. 1 and 2, reference character SH denotes a steering wheel, and reference character DP denotes an instrument panel. Further, windshield glass is denoted by reference character FG, and a center console which is provided between the driver's seat and the assistant driver's seat is denoted by reference character CC.

The vehicle V has front side doors SD1 arranged on right-and-left sides of the first row seat ST1 and rear side doors SD2 arranged on right-and-left sides of the second row seat ST2. Passenger's ingress and egress for the third row seat ST3 is attained by using the rear side doors SD2. A rear wall portion of the vehicle V is formed by a back door BD which is configured to be open or closed. As shown in FIG. 2, the first row seat ST1 comprises the driver's seat and the assistant driver's seat, and two passengers are capable of being seated in this seat ST1. The second row seat ST2 has three passengers capable of being seated therein. The third row seat ST3 has two passengers capable of being seated therein.

A passenger (seat-sitting) detection sensor JS to detect passenger's seat-sitting, such as a pressure-sensing switch, is provided at each seat (seat cushion). Further, door switches DS1 to detect an open state of the rear side doors SD2 and door switches DS2 to detect an open state of the back door BD are provided at the vehicle V.

A front-seat air conditioner K and a rear-seat air conditioner KR, which are separately independent from each other, are provided at the vehicle V. First, the front-seat air conditioner K will be described referring to FIG. 3. A switching damper 3, a blower fan 4, and an evaporator 5 are arranged in order from an upstream side (an inlet port 1) toward a downstream side in a passage portion 2 including the inlet port 1. A downstream portion of the evaporator 5 in the passage portion 2 is divided into two independent passages 7, 8 which are arranged in parallel to each other by a partition wall 6, and a common chamber 9 is formed at a downstream side of the independent passages 7, 8 where the independent passages 7, 8 join together.

Figure 3:
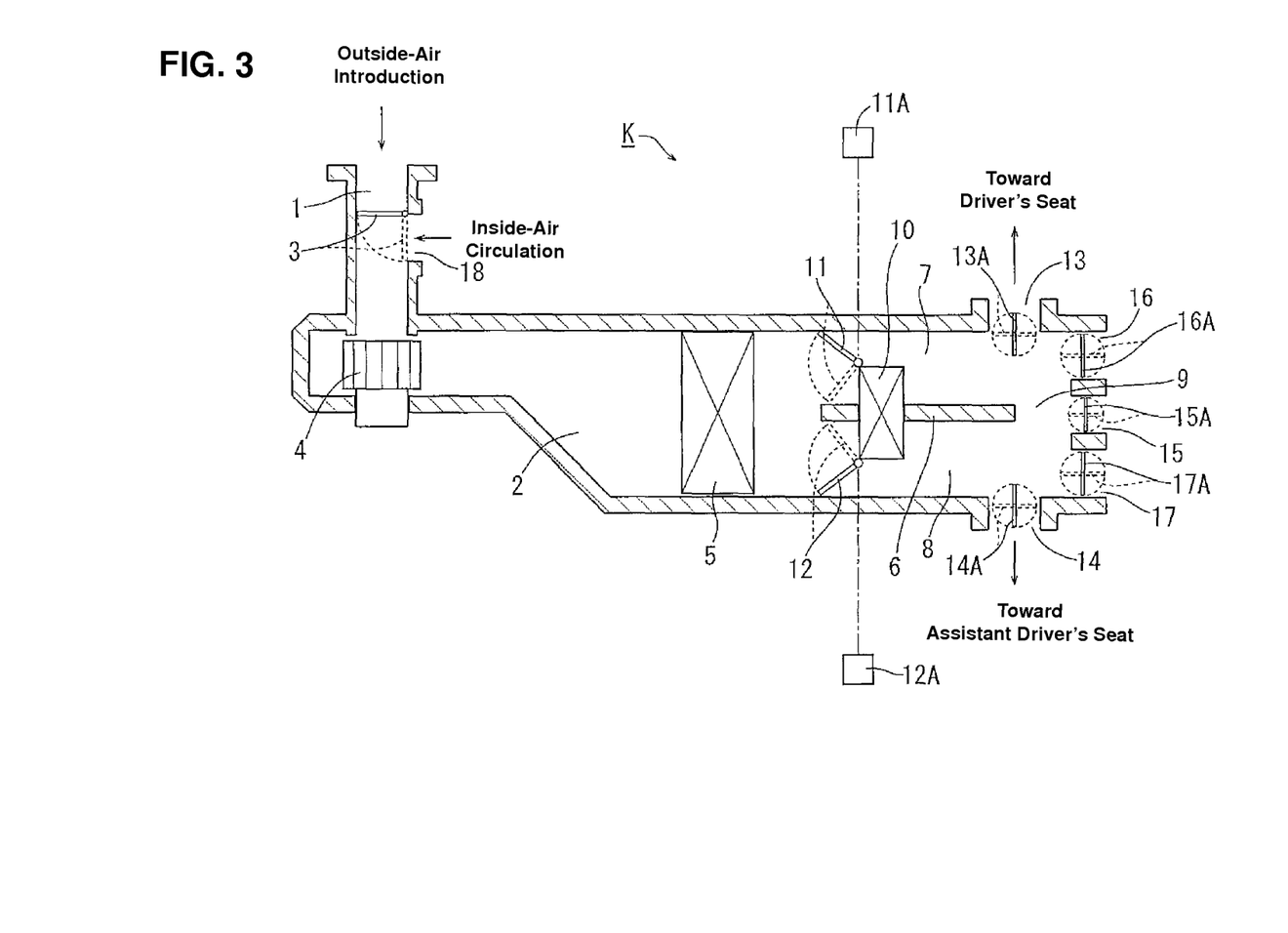
FIG. 3 is a systematic diagram showing an example of an air conditioner.

A heater core 10 is held at the partition wall 6 such that it protrudes into the two independent passages 7, 8. An air mix damper 11 is arranged at a position right upstream of the heater core 10 in the independent passage 7. Similarly, an air mix damper 12 is arranged at a position right upstream of the heater core 10 in the independent passage 8. An air passage (air outlet) 13 for the driver's seat is formed at the passage portion 2 such that it opens to the independent passage 7 at a position upstream of the common chamber 9. Also, an air passage (air outlet) 14 for the assistant driver's seat is formed at the passage portion 2 such that it opens to the independent passage 8 at a position upstream of the common chamber 9. Further, plural air passages (air outlets) 15-17 open to the common chamber 9. The air passage 15 is provided for a defroster and the air passages 16, 17 are provided for side vents, for example. The air passages (air outlets) 13-17 are provided with dampers for adjusting an opening degree 13A-17A, respectively.

A rate of the cooling air flowing down the evaporator 5 which passes through the heater core 10 is changed by adjusting the opening degree (position) of the air mix damper 11, so that the temperature or the humidity of the air passing in the independent passage 7 is controlled. The air passing in the independent passage 7 is supplied toward the driver's seat. Herein, the air mix damper 11 is driven by an electric motor (actuator) 11A so that it can take any opening degree within an opening-degree range of 0-100%.

A rate of the cooling air flowing down the evaporator 5 which passes through the heater core 10 is changed by adjusting the opening degree (position) of the air mix damper 12, so that the temperature or the humidity of the air passing in the independent passage 8 is controlled. The air passing in the independent passage 8 is supplied toward the assistant driver's seat. Herein, the air mix damper 12 is driven by an electric motor (actuator) 12A so that it can take any opening degree within an opening-degree range of 0-100%.

As apparent from the above-described descriptions, the present embodiment is configured such that the air conditioning for the driver's seat and the air conditioning for the assistant driver's seat are controllable independently. And, the air-conditioning temperature for the driver's seat or the assistant driver's seat becomes the highest when the opening degree of the air mix dampers 11, 12 is 100% as shown in solid lines in the figure. Meanwhile, the air-conditioning temperature for the driver's seat or the assistant driver's seat becomes the lowest when the opening degree of the air mix dampers 11, 12 is 0% as shown in broken lines in the figure. Herein, the mixed air of the conditioning air flowing down the independent passages 7, 8 is supplied into the air passages 15-17.

Reference character 18 denotes an inside-air introduction port which is provided near the inlet port 1, and an outside-air introduction and an inside-air circulation are switched by the above-described switching damper 3.

Figure 4:
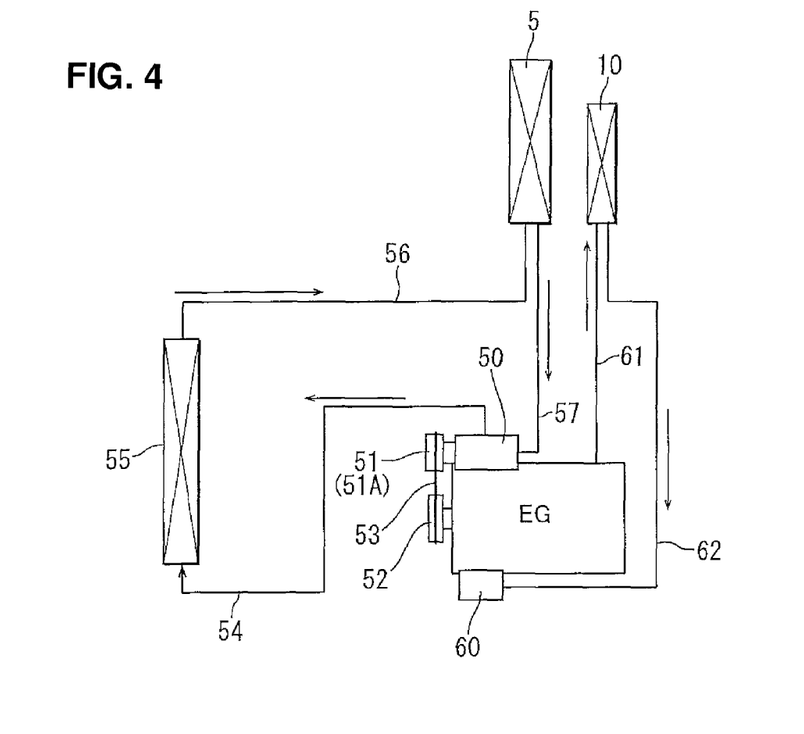
FIG. 4 is a diagram showing an example of a cool-air generator and a hot-air generator of a front-seat air conditioner.

FIG. 4 shows a circulation line of a coolant for the evaporator 5 and a circulation line of the engine cooling water for the heater core 10. In FIG. 4, a belt 53 is disposed between a pulley 51 attached to a rotational shaft of the compressor 50 and a pulley 52 attached to an engine EG (its crankshaft), so that the compressor 50 is rotatably driven by the engine EG. The coolant which is compressed by the compressor 50 is supplied to the evaporator 5 through a distribution pipe 54, a condenser 55, and a distribution pipe 56. The coolant supplied to the evaporator 5 is heat-exchanged with the conditioning air, and then returned to the compressor 50 through a distribution pipe 57. The above-described compressor 50, condenser 55 and evaporator 5 are main elements of the cool-air generator. Herein, a clutch 51A is installed into the pulley 51, so that driving of the compressor can be stopped even while the engine EG operates.

Meanwhile, the cooling water from a water pump 60 which is driven by the engine EG is supplied to the heater core 10 through a distribution pipe 61, and heat-exchanged with the conditioning air at the heater core 10. Then, the cooling water in the heater core 10 is returned to the water pump 60 through a distribution pipe 62. The water pump 60 and the heater core 10 are main element of the hot-air generator.

Figure 5:
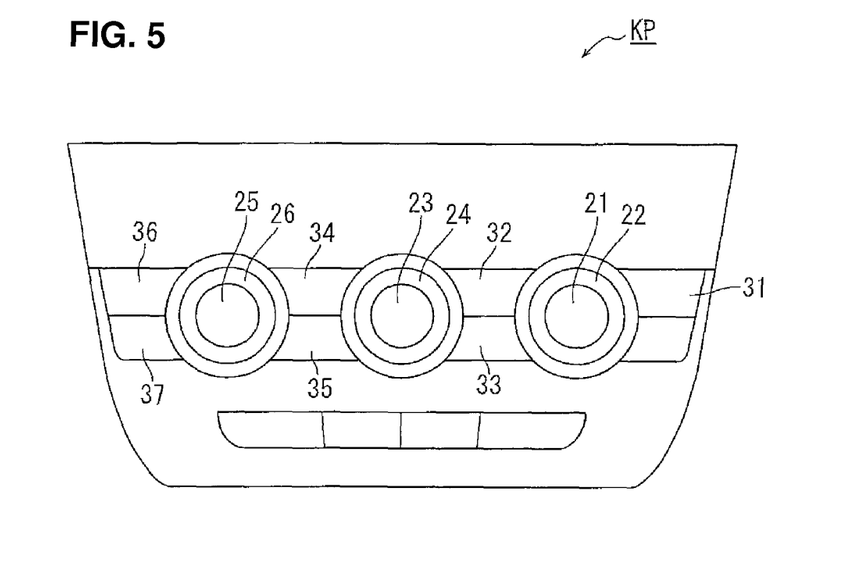
FIG. 5 is a diagram showing an example of an operational-panel portion of air conditioning of the front-seat air conditioner.

FIG. 5 shows an example of a panel portion for air conditioning KP which is operated by the passenger, which is arranged at the instrument panel. In the present embodiment, this panel portion for air conditioning KP is configured to independently perform a temperature controlling for each of the driver's seat and the assistant driver's seat, and comprises the following switches to be operated by the passenger.

A switch 21 is a main switch to turn on the automatic air conditioner, which is push-type. A switch 22 is a temperature setting switch for the driver's seat, which is dial-type. A switch 23 is an OFF switch of the automatic air conditioner, which is push-type. A switch 24 is a conditioning-air amount adjusting switch, which is dial-type. A switch 25 is the one to be operated for selecting a specified temperature for the assistant driver's seat, which is push-type. A switch 26 is the one for temperature adjusting for the assistant driver's seat, which is dial-type.

A switch 31 is the one to turn off the automatic air conditioner. A switch 32 is the one for operating a front defroster. A switch 33 is the one for operating a rear defroster. Switches 34, 35 are the ones for selecting conditioning-air outlets. A switch 36 is the one for selecting outside-air introduction. A switch 37 is the one for selecting inside-air circulation. These switches 31-37 are all push-type.

Figure 6:
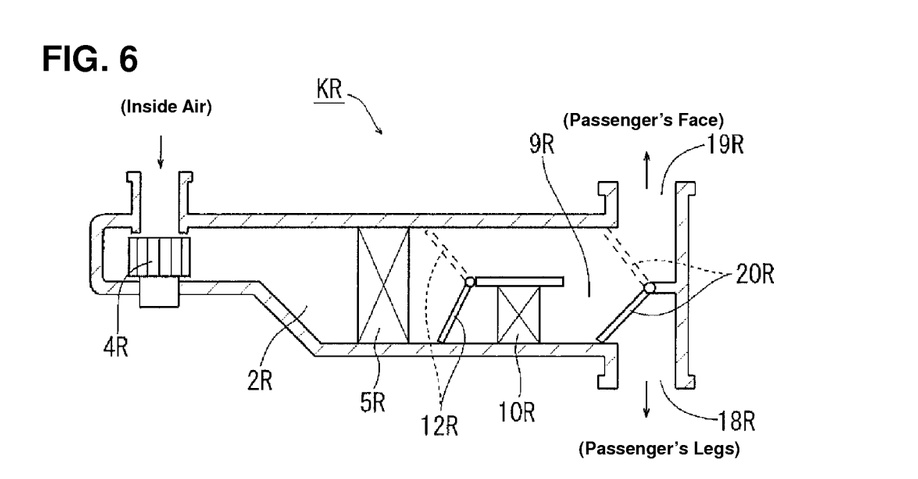
FIG. 6 is a diagram showing an example of a cool-air generator and a hot-air generator of a rear-seat air conditioner.

The rear-seat air conditioner KR has a basic structure which is common to the front-seat air conditioner K, and therefore some elements of the rear-seat air conditioner KR corresponding to those of the front-seat air conditioner K are denoted by the reference characters used for the front-seat air conditioner K and added character reference "R", respectively, detailed descriptions of which are omitted. That is, a passage portion of the rear-seat air conditioner KR is denoted by reference character 2R, a blower of that is denoted by reference character 4R, a common chamber of that is denoted by reference character 9R, a heater core of that is denoted by reference character 10R, and an air mix damper of that is denoted by reference character 12R.

The followings are different portions of the rear-seat air conditioner KR from the front-seat air conditioner K. First, only the inside air is flowed in (no outside-air introduction). Further, the air outlet comprises an air outlet for legs 18R and an air outlet for a face 19R, which are provided for the passenger seated in the second row seat ST2. A rear-mode damper for switching these air outlets is denoted by reference character 20R.

An evaporator 5R and a heater core 10R of the rear-seat air conditioner KR are smaller than those of the front-seat air conditioner K in the volume (size). The evaporator 5R of the rear-seat air conditioner KR is connected to the distribution pipe 57 in series or in parallel to the evaporator 5 of the front-seat air conditioner K, which is not illustrated in FIG. 5. Likewise, the heater core 10R of the rear-seat air conditioner KR is connected to the distribution pipe 62 in series or in parallel to the heater core 10 of the front-seat air conditioner K, which is not illustrated in FIG. 5. Herein, additional compressor 50 and condenser 55 for the evaporator 5R of the rear-seat air conditioner KR may be provided, and also additional distribution pipes of the engine cooling water for the heater core 10R may be provided.

As shown in FIGS. 1 and 2, the above-described front-seat air conditioner K is provided inside the instrument panel DP, and the rear-seat air conditioner KR is provided inside the center console CC. The air outlets 18R, 19R of the rear-seat air conditioner KR are positioned at a rear end portion of the center console CC (near a rear portion of the first row seat ST1 and in front of the second row seat ST2).

Figure 7:
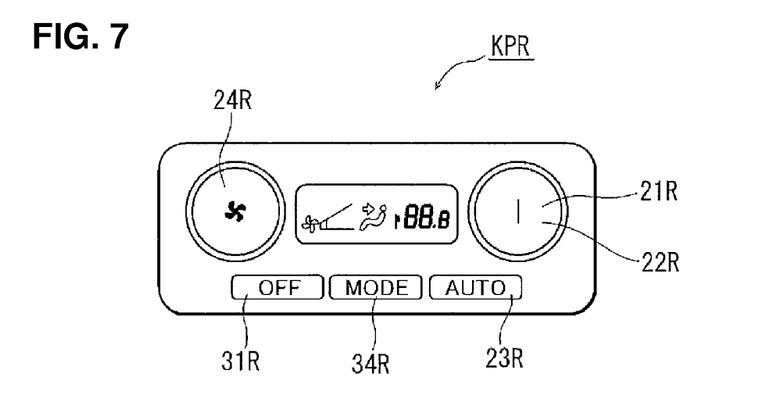
FIG. 7 is a diagram showing an example of an operational-panel portion of air conditioning of the rear-seat air conditioner.

FIG. 7 shows an example of a panel portion for rear-seat air conditioning KPR, which is arranged at the rear portion of the center console CC. The present embodiment includes the following switches. That is, a switch 21R is a main switch to turn on the rear-seat air conditioner KR, which is push-type. A switch 22R is a temperature setting switch for the driver's seat, which is dial-type. A switch 23R is an ON switch of the automatic air conditioner, which is push-type. A switch 24R is an air-amount adjusting switch, which is dial-type. A switch 31R is the one to turn off the air conditioner, which is push-type. A switch 34R is the one for selecting conditioning-air outlets, which is push-type (the selected outlets are changed each time this switch is pushed).

Figure 8:
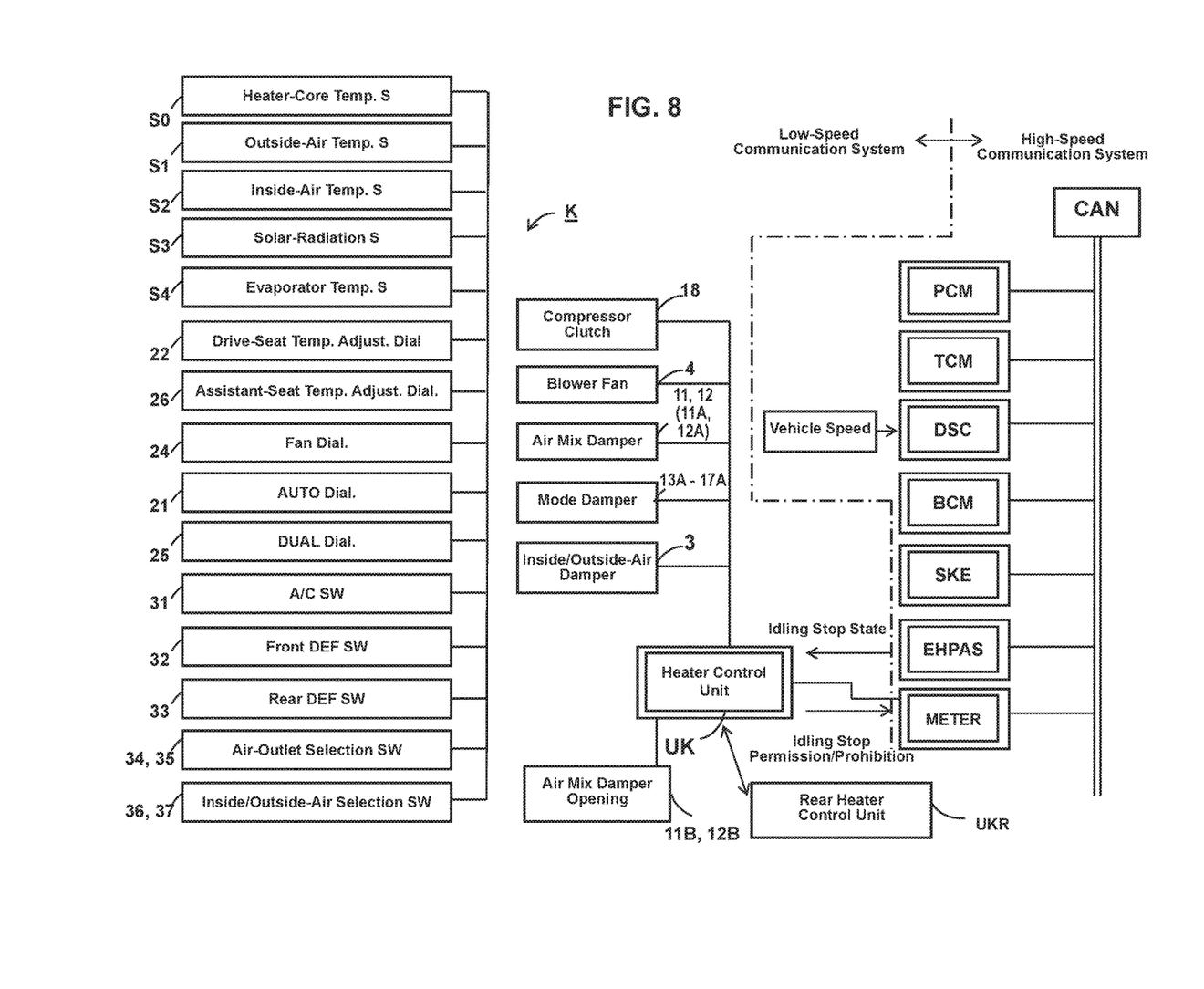
FIG. 8 is a diagram showing a control-system example of the front-seat air conditioner.
Figure 9:
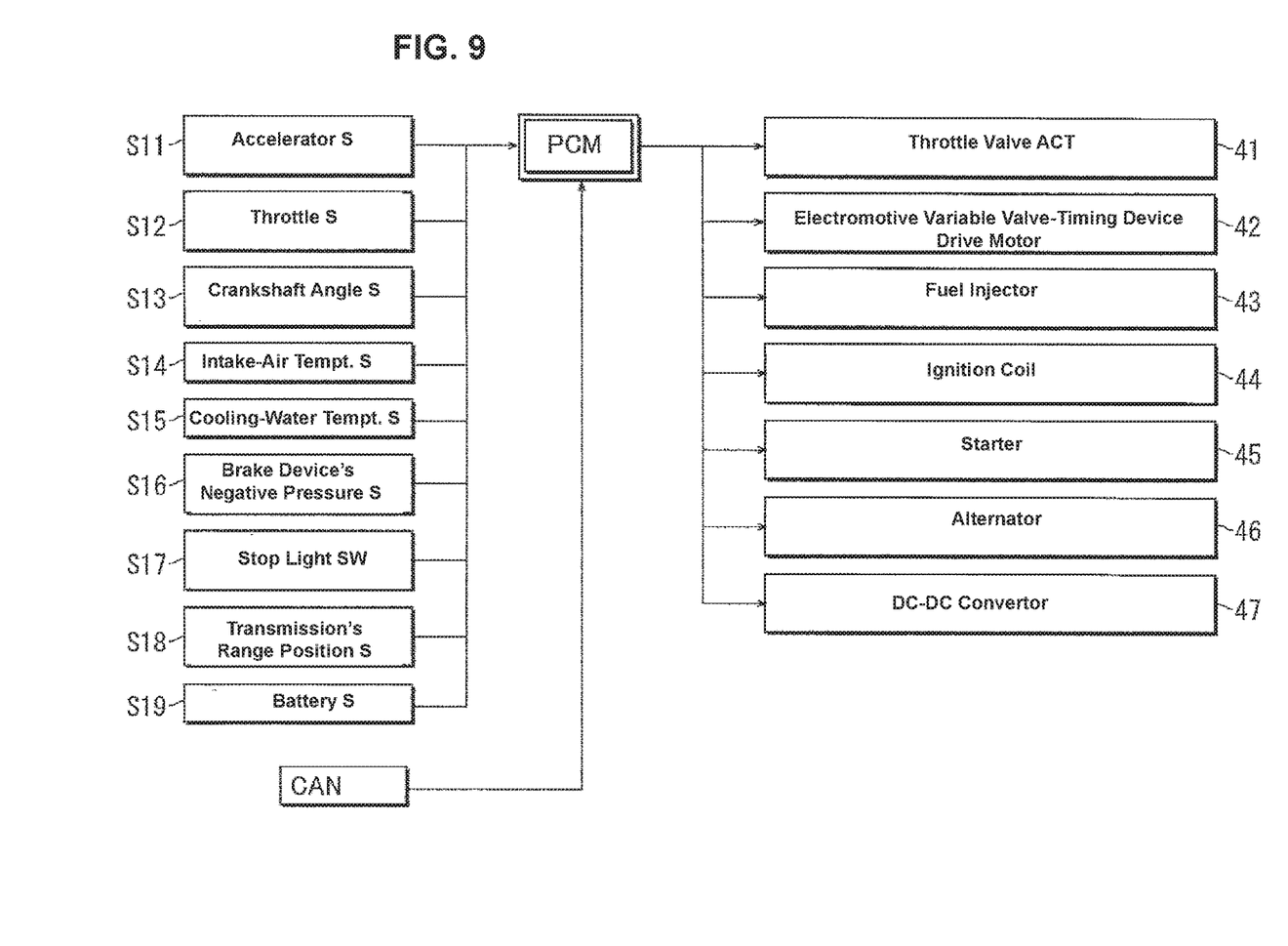
FIG. 9 is a diagram showing a control-system example of an engine automatic stop.

FIG. 8 shows a control-system example of the front-seat air conditioner K. In FIG. 8, reference character UK denotes a controller (control unit) of the air conditioner which uses a microcomputer. To this controller UK are inputted some signals from the above-described various switches, signals relating to a temperature of the heater core 10 which is detected by a temperature sensor S0, an outside-air temperature which is detected by an outside-air temperature sensor S1, a vehicle-compartment inside temperature which is detected by an inside-air temperature sensor S2, a solar-radiation state which is detected by a solar-radiation sensor S3 provided inside the vehicle compartment, and a temperature of the evaporator 8 which is detected by a temperature sensor S4, and also signals from opening sensors 11B, 12B to detect actual opening degrees of the air mix dampers 11, 12. Further, the controller UK is configured to control the above-described dampers and various instruments 1, 4, 11 (11A), 12 (12A), 13A-17A, 18 and also the compressor clutch 51A which is provided in a driving-force transmission line between the engine and the coolant compressor (see FIG. 4). The controller UK is connected to the above-described sensors, switches, instruments and others by a low-speed communication system.

Basically, the controller UK sets a target vehicle-compartment inside temperature according to the environmental conditions inside/outside of the vehicle compartment detected by the various sensors S0-S4, and performs an automatic control regarding the best conditioning-air supply amount, conditioning-air temperature, selection of the conditioning-air outlets and others for adjusting the actual vehicle-compartment inside temperature at the target vehicle-compartment inside temperature.

Figure 10:
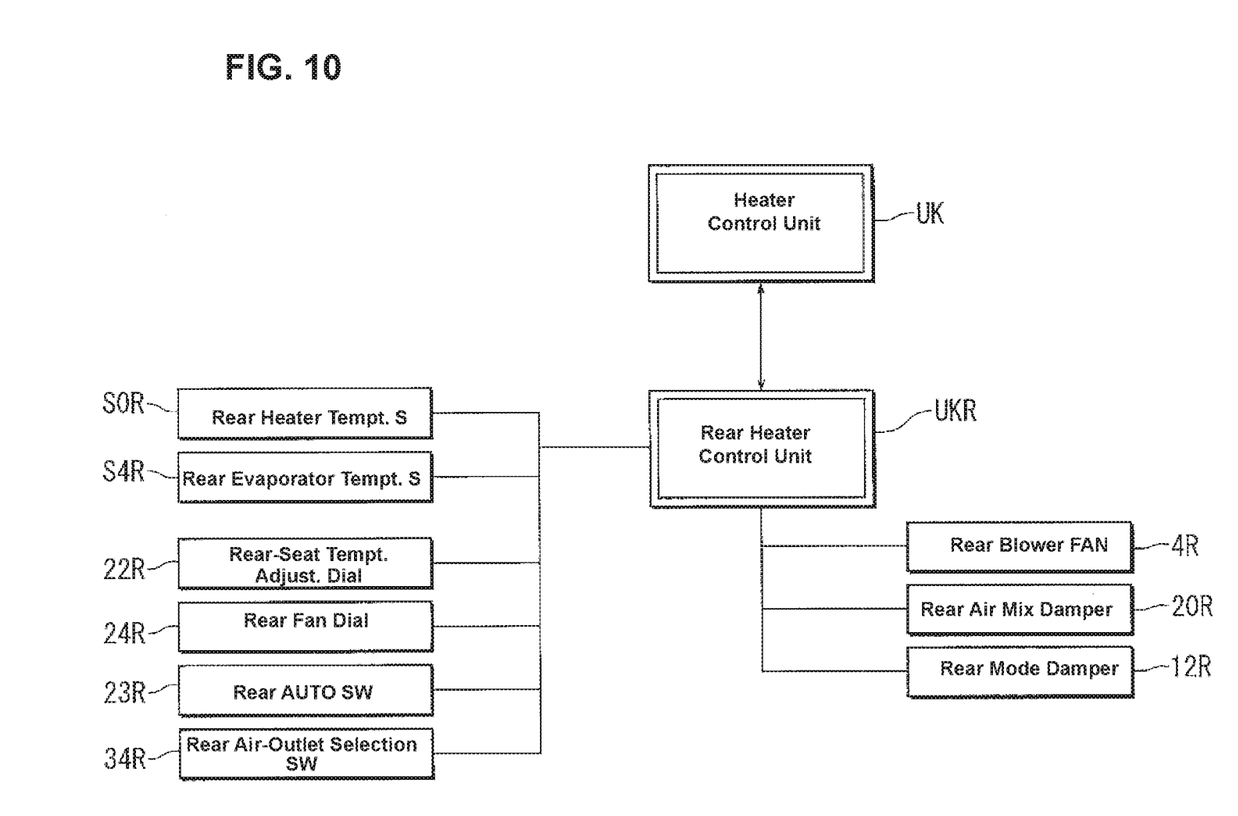
FIG. 10 is a diagram showing a control-system example of the rear-seat air conditioner.

The above-described control unit UK is connected to a control unit UKR which is a controller for the rear-seat air conditioner KR, a control-system example of which is shown in FIG. 10. In FIG. 10, sensors and instruments which correspond to those shown in FIG. 8 are denoted by the reference characters indicated in FIG. 8 and added character reference "R", respectively, detailed descriptions of which are omitted.

The controller UK of the low-speed communication system shown in FIG. 8 is connected to a high-speed communication system (CAN) via the meters provided at the instrument panel. This high-speed communication system includes PCM to perform engine controls including an engine automatic stop and an engine automatic restart, TCM to perform a shift control and others of an automatic transmission, DSC to perform brake controls including an automatic brake control during the engine's automatic stop, BCM to perform controls around a vehicle body including detecting of a door's open/close state, a keyless control module (indicated as SKE) to perform controls of smart keyless including detecting a key left behind in the vehicle compartment, and EHPAS to perform a power-steering control. Information relating to an idling stop state is inputted to the controller UK from the PCM, and the controller UK outputs signals of permission or prohibition of the idling stop according to the air-conditioning control state, which will be described below. Further, a vehicle speed sensor S10 is coupled to the DSC, and a vehicle speed detected by the vehicle speed sensor S10 is inputted to the controller UK and the PCM by way of the CAN.

Figure 11:
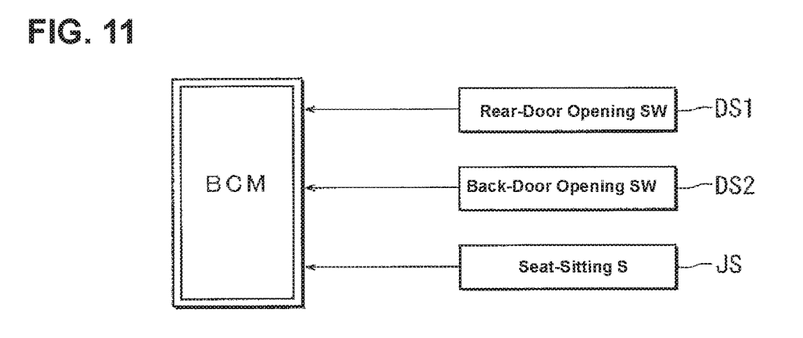
FIG. 11 is a diagram showing an example of input signals to a BCM shown in FIG. 8.

As shown in FIG. 11, the switches JS, DS1, DS2 shown in FIG. 1 are inputted to the above-described BCM. When it is detected based on the detection signals of the door switches DS1, DS2 that the side door SD1 or the back door BR are open for a while for loading of baggage or something, the air conditioning for the rear seat is disturbed greatly, and also this situation may be recognized by the passenger, so that it may be considered that the demand of the air conditioning for the rear-seat air conditioner KR is low. Accordingly, in this case, the idling-stop prohibition signal according to the air-conditioning control state of the rear-seat air conditioner KR is not outputted. This point does not relate to the present invention directly, so more detailed description about this is omitted.

FIG. 7 shows a specific control-system example relating to the PCM which serves as a controller to perform the idling-stop control. In FIG. 7, signals from various sensors and switches S10-S19 are inputted to the PCM. The sensor S11 is an accelerator sensor to detect an opening degree of an accelerator. The sensor S12 is a throttle sensor to detect an opening degree of a throttle. The sensor S13 is an angle sensor to detect a rotational angle of a crankshaft. The sensor S14 is an intake-air temperature sensor to detect an intake-air temperature. The sensor S15 is a water temperature sensor to detect a cooling-water temperature. The sensor S16 is a negative-pressure sensor to detect a negative pressure of a brake device including a negative-pressure type booster. The sensor S17 is a brake switch to detect a pressing operation of a brake pedal (serving as a stop light switch, too). The sensor S18 is a range-position sensor to detect a range position of the automatic transmission. The sensor S19 is a battery sensor to totally detect the charge amount, voltage, consumption current and the like of a battery.

The PCM controls the following various instruments 41-47 in relation to the engine controls of the automatic stop (idling stop) and restart. That is, reference character 41 denotes an actuator to drive the throttle valve, which is fully closed during the engine's automatic stop. Reference character 42 denotes a drive motor of an electromotive variable valve-timing device, which performs delaying of the open/close timing of an intake valve during the engine's automatic stop in order to prepare the automatic restart. Reference character 43 denotes a fuel injector, which is controlled such that a fuel injection by that is cut off during the engine's automatic stop. Reference character 44 denotes an ignition coil, which is controlled such that a power supply to this coil is cut off during the engine's automatic stop in order to prohibit its ignition. Reference character 45 denotes a starter, which is driven at the engine's automatic restart. Reference character 46 denotes an alternator, which is controlled such that its load is increased in order to decrease an engine speed during the engine's automatic stop. Reference character 47 denotes a DC/DC convertor, which is controlled such that a power decrease of the battery is compensated when engine's cranking is performed in order to prepare for the engine automatic restart.

While the idling stop to automatically stop the engine is performed when the vehicle stops, this control of the idling stop is executed on condition that any of idling-stop prohibition conditions which will be described below is not met The automatic-stop prohibition conditions (idling-stop prohibition conditions):

(1) the vehicle speed is not zero;
(2) the brake operation by the passenger is not performed;
(3) the pressing operation of the accelerator is performed;
(4) the voltage of the battery is a specified voltage or lower, the charge amount is a specified charge amount or smaller, the consumption current is a specified current or greater, or a battery control system is abnormal (i.e., an abnormal signal is generated);
(5) a steering angle of the steering wheel is not within a specified small-angle range from a neutral position of the steering wheel;
(6) a shift range of the transmission is not the D range position of the transmission, an oil temperature is not within a specified temperature range, an oil pressure is not within a specified pressure range, an abnormal signal of the transmission is generated, any of clutches (including a lockup clutch) of the transmission is abnormal;
(7) the temperature of the engine's cooling water is not within a specified temperature range, the temperature of the intake air is too high, the pressure of the atmosphere is low;
(8) the negative pressure of the brake device including the negative-pressure type booster is short, or an abnormal signal of the engine system is generated;
(9) an ignition key is carried out of the vehicle (in a case of an smart keyless entry system), a seatbelt is not applied, any of the doors is open, or an engine hood (bonnet) is open;
(10) a slant angle of a road surface is large; and
(11) an automatic-stop prohibition signal is outputted from the air-conditioning controller UK (which will be described specifically below).

The above-described conditions are merely one example of the automatic-stop prohibition conditions, and any other prohibition conditions may be added. For example, a condition that the engine speed is equal to or higher than a preset speed (a speed considerably higher than an idling speed of the engine running stably) when an IS switch (not illustrated) to be operated by a driver who intends to cancel (prohibit) the engine automatic stop, or the like may be added further. By contrast, part of the above-described prohibition conditions may be deleted.

An automatic-restart starting condition for automatically restart the engine from the idling-stop state of the engine can be set such that any one of the above-described automatic-stop prohibition conditions is cancelled, and in particular, it may be preferable to set the automatic-restart starting condition such that at least the brake operation by the passenger is cancelled.

Next, the automatic-stop prohibition conditions related to the air conditioner K will be described (which are basically the same for the air conditioner KR). First, the automatic control of the air conditioning is performed such that the actual vehicle-compartment inside temperature detected by the inside-air temperature sensor S2 approaches the target vehicle-compartment inside temperature which is set by the temperature adjusting dial-type switches 22, 26 selected by the passenger. In this air-conditioning automatic control, the temperature of the conditioning air, the selection of the air outlets, the supply amount of the conditioning air, and others are controlled automatically.

The air-conditioning controller UK outputs a prohibition signal to prohibit the engine automatic stop in the following cases when the vehicle stops in order to prioritize the air conditioning. Herein, the air-conditioning controller UK outputs an automatic-stop permission signal when it does not output the automatic-stop prohibition signal.

The automatic-stop prohibition conditions from the side of the air conditioner:

(1) the various sensors and the like of the air conditioner K become abnormal;
(2) the outside-air temperature is extremely high (40° C. or higher, for example), or extremely low (−10° C. or lower, for example);
(3) the defroster is in use (to prioritize ensuing of the visibility);
(4) the vehicle-compartment inside temperature selected by the passenger is equal to an upper limit on the high-temperature side (the demand of heating is extremely high);
(5) the vehicle-compartment inside temperature selected by the passenger is equal to a lower limit on the low-temperature side and the air conditioner is in operation (the demand of cooling is extremely high); and
(6) a difference between the target vehicle-compartment inside temperature and the actual vehicle-compartment inside temperature is greater than a specified value.

The air-conditioner controller UK performs the air-conditioning control even at the engine's automatic stop when the above-described automatic-stop prohibition conditions are not met. This is the same for the air-conditioner controller for the rear seat UKR, and when a specified condition is met, its operation is stopped during the engine's automatic stop as described later.

Herein, the front-seat air conditioner K and the rear-seat air conditioner KR are configured to continue their operations basically when the engine is automatically stopped by the idling stop. However, when the temperature of the evaporator 5, 5R increases over a specified preset upper-limit temperature in a state in which their operations are continued during the cooling, these air conditioners K, KR output the automatic-stop prohibition signal in order to automatically restart the engine because the cool-air generating function may not be expected. Likewise, when the temperature of the heater core 10, 10R decreases below a specified preset lower-limit temperature in a state in which their operations are continued during the heating, these air conditioners K, KR output the automatic-stop prohibition signal in order to automatically restart the engine because the hot-air generating function may not be expected.

Herein, it is the base that the air conditioners K, KR continue their operations during the heating when the engine is automatically stopped as described above. However, in a case in which the number of passengers is a specified number (five, for example) or larger during the heating, the front-seat air conditioner K continues its operation, but the rear-seat air conditioner KR stops its operation. The above-described situation where the passenger's number is the specified number (five, for example) or larger means that many passengers are seated in the vehicle, that is—three or more passengers are seated in the rear seat composed of the second row seat ST2 and the third row seat ST3 (if no passenger is seated in the assistant driver's seat, further more passengers are seated in the rear seat).

In a case in which many passengers are seated, the calorific value of the passengers becomes so large that the demand of the heating may be low. Therefore, even if the operation of the rear-seat air conditioner KR at the engine's automatic stop is stop, the comfortability may not deteriorate because of the shortage of the heating. Further, the operation stop of the rear-seat air conditioner KR brings about stopping of the blower 4R, so that the power consumption is decreased further. Thereby, the fuel economy of the engine can be improved more preferably in conjunction with the engine automatic stop.

In the case in which many passengers are seated, meanwhile, the humidity inside the vehicle compartment increases because of some quantity of water released from the passengers, so that the possibility that the windshield glass FG gets fogged becomes high. However, since the front-seat air conditioner K continues to operate, the windshield glass FG can be prevented from being fogged. It is preferable to switch to the outside-air introduction mode while the front-seat air conditioner K operates. That is, since the cool and low-humid outside air passes through the evaporator 5 because of the outside-air introduction, the degree of heating the evaporator 5 with the outside air becomes low, so that the continuous operational time of the front-seat air conditioner K at the engine's automatic stop can be kept properly long. This delays the timing of the engine automatic restart according to a temperature increase of the evaporator 5, so that the term of the engine automatic stop is prolonged (fuel-economy improvement).

Figure 12:
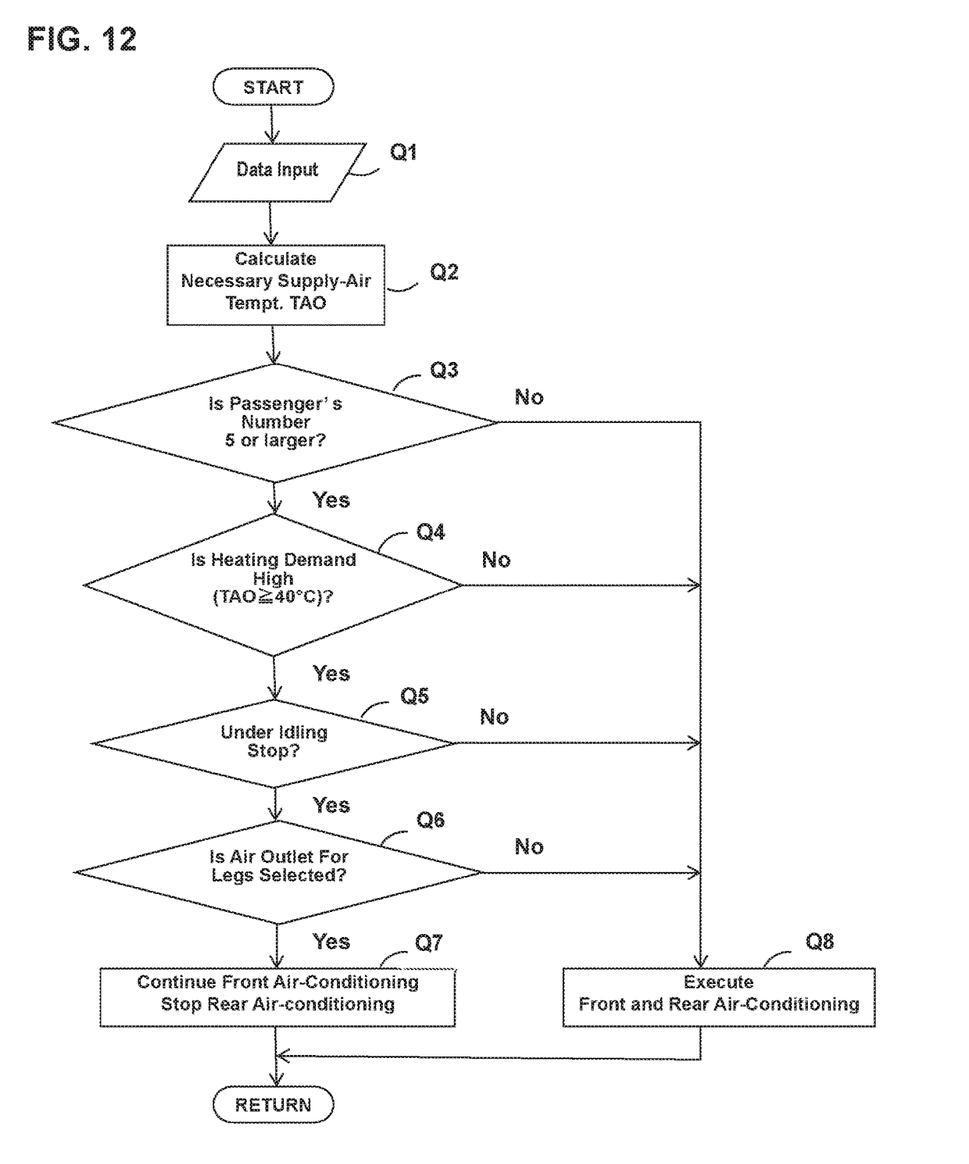
FIG. 12 is a flowchart showing an example of a control according to the present invention.

FIG. 12 is a flowchart showing control examples of the air conditioners K, KR according to the above-described engine automatic stop. In the flowchart, reference character Q denotes a control step.

First, in step Q1, the signals from the various sensors, switches and others are inputted. Then, a necessary supply-air temperature TAO is calculated in step Q2. This necessary supply-air temperature TAO is calculated based on at least one of a setting vehicle-compartment inside temperature which is manually set by the passenger or the vehicle-compartment inside temperature, or the both, for example.

In the next step Q3 after the step Q2, it is judged whether or not the number of passengers (seated) in the vehicle is equal to or larger than a specified number (five in the embodiment). When the judgment of the step Q3 is YES, it is judged in step Q4 whether the demand of heating is high or not. This judgment of the step Q4 is done by judging whether the necessary supply-air temperature TAO is a specified temperature (40° C., for example) or higher, for example. When the judgment of the step Q4 is YES, it is judged in step Q5 whether the engine is currently in the automatic-stop state which is performed by the idling stop or not. When the judgment of the step Q5 is YES, it is judged in step Q6 whether the air outlet for legs is selected as the conditioning-air outlet for the rear seat or not. When the judgment of the step Q6 is YES, the operation of the rear-seat air conditioner KR is stopped but the operation of the front-seat air conditioner K is continued (the outside-air introduction mode is set) in step Q7.

When the judgment of the steps Q3, Q4, Q5, Q6 is NO, the control proceeds to step Q8, where a basic control is executed (both the air conditioners K, KR operate). Herein, the calculation of the step Q2 and the judgment of step Q4 may be performed only for the front-seat air conditioner K, or both for the air conditioners K, KR (for example, when the situations for both the air conditioners K, KR are YES respectively, the control is set as AND conditions such that the judgments of their corresponding steps become YES eventually).

The present invention should not be limited to the above-described embodiment, and any other modifications or improvements may be applied within the scope of a spirit of the present invention. The following cases are included in the present invention, for example. The operation of the rear-seat air conditioner KR may be stopped during the engine's automatic stop at the heating when the number of passengers seated in the rear seat is equal to or larger than a specified number (the control according to the number of passengers seated in the rear seat only, not according to the number of all passengers in the vehicle). The seat of the vehicle may be composed of two front-and-rear row seats (no third row seat). The number of passengers capable of being seated in the second row seat ST2 may be set at two, and the number of passengers capable of being seated in the third row seat ST3 may be set at three. The rear-seat air conditioner KR may be configured such that its air outlets (a cool-air outlet, particularly) are located at a high level neat a vehicle roof. Of course, the object of the present invention implicitly includes providing any structure which has been described substantially as a preferable or advantageous one.

What is claimed is:

1. A control device of a vehicle provided with a front-seat air conditioner, a rear-seat air conditioner which is separately independent from the front-seat air conditioner, and an engine to be automatically stopped under preset stop-conditions, the control device comprising a controller to control operations of the front-seat air conditioner and the rear-seat air conditioner and an automatic stop of the engine,
wherein said controller is configured to determine a number of seated passengers in the vehicle, to compare the number of seated passengers to a preset number, and, if the number of seated passengers is under all conditions being selectable of greater than or equal to the preset number, to stop the operation of the rear-seat air conditioner and continue the operation of the front-seat air conditioner during performance of an automatic-stop control of the engine and during a heating operation.

2. The control device of the vehicle of claim 1, wherein the vehicle is configured to seat a first number of passengers behind an air outlet of the front-seat air conditioner but in front of an air outlet of the rear-seat air conditioner and to seat a second number of passengers behind the air outlet of the rear-seat air conditioner, wherein the first number is smaller than the second number.

3. The control device of the vehicle of claim 1, wherein when said stopping of the operation of the rear-seat air conditioner is performed, an operational mode of the front-seat air conditioner is adjusted at an outside-air introduction mode.

4. The control device of the vehicle of claim 2, wherein when said stopping of the operation of the rear-seat air conditioner is performed, an operational mode of the front-seat air conditioner is adjusted at an outside-air introduction mode.

5. The control device of the vehicle of claim 1, wherein the vehicle has a first row seat including a driver's seat, a second row seat, and a third row seat in order from the front to the rear of the vehicle, the air outlet of the front-seat air conditioner is located in front of the first row seat, and the air outlet of the rear-seat air conditioner is located in the vicinity of a rear portion of the first row seat and in front of the second row seat.

6. The control device of the vehicle of claim 2, wherein the vehicle has a first row seat including a driver's seat, a second row seat, and a third row seat in order from the front to the rear of the vehicle, the air outlet of the front-seat air conditioner is located in front of the first row seat, and the air outlet of the rear-seat air conditioner is located in the vicinity of a rear portion of the first row seat and in front of the second row seat.

7. The control device of the vehicle of claim 3, wherein the vehicle has a first row seat including a driver's seat, a second row seat, and a third row seat in order from the front to the rear of the vehicle, the air outlet of the front-seat air conditioner is located in front of the first row seat, and the air outlet of the rear-seat air conditioner is located in the vicinity of a rear portion of the first row seat and in front of the second row seat.

8. The control device of the vehicle of claim 4, wherein the vehicle has a first row seat including a driver's seat, a second row seat, and a third row seat in order from the front to the rear of the vehicle, the air outlet of the front-seat air conditioner is located in front of the first row seat, and the air outlet of the rear-seat air conditioner is located in the vicinity of a rear portion of the first row seat and in front of the second row seat.

9. The control device of the vehicle of claim 1, wherein the vehicle is configured to seat a number of passengers behind an air outlet of the front-seat air conditioner but in front of an air outlet of the rear-seat air conditioner, and wherein the preset number is larger than the number of passengers behind the air outlet of the front-seat air conditioner but in front of the air outlet of the rear-seat air conditioner.

10. A control device of a vehicle provided with a front-seat air conditioner, a rear-seat air conditioner which is separately independent from the front-seat air conditioner, and an engine to be automatically stopped under preset stop-conditions, the control device comprising a controller to control operations of the front-seat air conditioner and the rear-seat air conditioner and an automatic stop of the engine, wherein said controller is configured to determine a number of passengers seated behind an air outlet of the rear-seat air conditioner, to compare the number of passengers seated behind the air outlet of the rear-seat air conditioner to a preset number, and, if the number of passengers seated behind the air outlet of the rear-seat air conditioner is under all conditions being selectable of greater than or equal to the preset number, to stop the operation of the rear-seat air conditioner and continue the operation of the front-seat air conditioner during performance of an automatic-stop control of the engine and during a heating operation.

* * * * *